United States Patent
Andersson et al.

(10) Patent No.: US 9,004,313 B2
(45) Date of Patent: Apr. 14, 2015

(54) STACK OF INTERFOLDED FIRST AND SECOND SHEETS

(75) Inventors: Anders Andersson, Stenungsund (SE); Björn Larsson, Billdal (SE)

(73) Assignee: SCA Hygiene Products AB, Gothenburg (SE)

( * ) Notice: Subject to any disclaimer, the term of this patent is extended or adjusted under 35 U.S.C. 154(b) by 0 days.

(21) Appl. No.: 14/131,461

(22) PCT Filed: Jul. 13, 2011

(86) PCT No.: PCT/EP2011/061937
§ 371 (c)(1),
(2), (4) Date: Jan. 8, 2014

(87) PCT Pub. No.: WO2013/007301
PCT Pub. Date: Jan. 17, 2013

(65) Prior Publication Data
US 2014/0291186 A1    Oct. 2, 2014

(51) Int. Cl.
*B65D 25/38*   (2006.01)
*B32B 7/06*    (2006.01)
(Continued)

(52) U.S. Cl.
CPC .............. *B65D 25/38* (2013.01); *Y10T 428/15* (2015.01); *Y10T 428/19* (2015.01); *B32B 7/14* (2013.01); *A47K 10/42* (2013.01); *B65H 45/24* (2013.01); *B32B 7/06* (2013.01)

(58) Field of Classification Search
CPC ........... A47K 10/42; B32B 7/14; B65H 45/24
USPC ........................................ 221/49, 50, 57, 66
See application file for complete search history.

(56) References Cited

U.S. PATENT DOCUMENTS 1,381,307 A    6/1921  Hudson
5,265,758 A *  11/1993 Saint Criq et al. .............. 221/35
(Continued)

FOREIGN PATENT DOCUMENTS

EP    0 287 766 A1   10/1988
EP    1 118 568 A2   7/2001
(Continued)

OTHER PUBLICATIONS

International Search Report (PCT/ISA/210) mailed on Apr. 5, 2012, by the European Patent Office as the International Searching Authority for International Application No. PCT/SE2011/061937.
(Continued)

*Primary Examiner* — Michael K Collins
(74) *Attorney, Agent, or Firm* — Buchanan Ingersoll & Rooney PC (57) ABSTRACT

A stack of hygiene sheet products including first and second webs that are interfolded with each other. The stack includes a top panel of the first web and a top panel of the second web, wherein the top panel of the first web overlays the top panel of the second web but has been cut away so that the top panel of the second web is revealed by the top panel of the first web. An adherence layer is placed on the top panel of the first web and the top panel of the second web and is exposed at the top of the stack so that it can adhere to an adjacent stack so that when the last sheets of the adjacent stack are pulled through a dispenser opening of a dispenser, the first and second sheets are pulled securely through with it as a result of the direct adherence.

23 Claims, 2 Drawing Sheets

(51) Int. Cl.
  *B32B 7/14* (2006.01)
  *B65H 45/24* (2006.01)
  *A47K 10/42* (2006.01)

(56) References Cited

U.S. PATENT DOCUMENTS

| | | | |
|---|---|---|---|
| 6,196,390 B1 * | 3/2001 | Bando | 206/494 |
| 6,286,712 B1 * | 9/2001 | Craig et al. | 221/48 |
| 6,612,462 B2 * | 9/2003 | Sosalla et al. | 221/48 |
| 7,204,390 B2 * | 4/2007 | Widlund | 221/47 |
| 8,097,326 B2 * | 1/2012 | Wunderlich | 428/126 |
| 8,205,748 B2 * | 6/2012 | Long et al. | 206/494 |
| 8,857,611 B2 * | 10/2014 | Thorburn et al. | 206/233 |
| 8,877,313 B2 * | 11/2014 | Larsson | 428/43 |
| 2003/0091786 A1 * | 5/2003 | Mansson | 428/124 |
| 2004/0115393 A1 * | 6/2004 | Vogel et al. | 428/121 |
| 2009/0050646 A1 * | 2/2009 | Windorski | 221/33 |
| 2011/0108202 A1 | 5/2011 | Maurice | |
| 2011/0129633 A1 * | 6/2011 | Andersson | 428/43 |
| 2014/0134376 A1 * | 5/2014 | Larsson | 428/43 |
| 2014/0135192 A1 * | 5/2014 | Andersson et al. | 493/356 |
| 2014/0209624 A1 * | 7/2014 | Larsson | 221/45 |
| 2014/0291186 A1 * | 10/2014 | Andersson et al. | 206/449 |

FOREIGN PATENT DOCUMENTS

| | | |
|---|---|---|
| EP | 1 462 389 A1 | 9/2004 |
| WO | WO 00/00072 A1 | 1/2000 |
| WO | WO 2006/071148 A1 | 7/2006 |
| WO | WO 2010/007260 A1 | 1/2010 |

OTHER PUBLICATIONS

Written Opinion (PCT/ISA/237) mailed on Apr. 5, 2012, by the European Patent Office as the International Searching Authority for International Application No. PCT/SE2011/061937.

* cited by examiner

STACK OF INTERFOLDED FIRST AND SECOND SHEETS

FIELD OF THE INVENTION

The present invention is directed to a stack of interfolded first and second sheets and particularly the manner by which the stack is connected to a second stack.

BACKGROUND

WO 00/00072 discloses interfolded napkins comprising first and second napkin sheets. The first napkin sheet is divided into many napkins connected to one another by tab parts of a line of perforation. The second napkin sheet is similarly formed. The first and second napkin sheets are interfolded with each other to form a stack of interfolded napkins. The lines of perforation of the first sheet may be aligned with folds of the second sheet so that the first sheet is folded at the lines of perforation in the interfolded stack. In an alternative stack disclosed in WO 00/00072, the interfolding is such that the lines of perforation are positioned between adjacent folds so that folds are not formed at lines of perforation. In both versions, the first and second sheets can be described as being interfolded with each other in an offset way since the lines of perforation of the first and second sheets are offset with respect to one another along the longitudinal direction of the first and second sheets.

In WO 00/00072, napkins of the stack are dispensed from a dispenser through a dispenser opening and torn away from the corresponding napkin sheet at the lines of perforation. The longitudinal offset of the lines of perforations of the first sheet relative to the lines of perforations of the second sheet result in the dispenser revealing just one more forwardly protruding sheet at the dispensing opening to reduce the chance of both sheets being grasped as would occur if the offset was marginal or non-existent. The interfolding of the sheets means that when a napkin of the first sheet is pulled through the opening of the dispenser, part of a napkin of the second sheet comes through the opening with it. The protruding part of the napkin of the second sheet can be grasped by a user for dispensing convenience. As compared to interfolded napkins where each napkin is pre-separated from one another in the stack (in contrast to interfolded offset sheets where each napkin is connected to an adjacent napkin by a line of perforation), there is a reduced risk for a dispensing failure to occur whereby the next napkin in the stack is not pulled through with the napkin being dispensed.

U.S. Pat. No. 1,381,307 and EP 0287766 also disclose stacks of interfolded offset sheets.

The prior art interfolded sheet stacks enable a first sheet hygiene product (e.g. napkin, towel, tissue or the like) of one sheet to be pulled partly through a dispensing opening of a dispenser when a second sheet hygiene product of the second sheet is dispensed through the dispensing opening for convenience in revealing to a user the next product to be dispensed. While the prior art interfolded stacks are generally successful in pulling a product of the other sheet with the product of the other sheet being dispensed for most of the stack, the present inventors have found that a dispensing failure can still occur at the transition from one stack to a next stack in the dispenser.

SUMMARY

The present invention is thus directed at the technical objective of improving the reliability of sheets of a new stack of interfolded sheets being pulled through a dispensing opening as a preceding stack is finished.

In one aspect of the invention, there is provided a stack of interfolded first and second sheets, wherein the stack comprises an adherence layer for adhering a start of the stack to an end of a preceding stack, and wherein the adherence layer is applied on the first and the second sheets so that the first and second sheets at the start of the stack are adhered to the end of the preceding stack.

Both the first and the second sheets will be adhered to a preceding stack in a dispenser. This ensures that both the first and second sheets are pulled through the dispensing opening at the start of the next stack, thereby meeting the technical objective given above. If only one of the sheets has the adherence layer, then there is a possibility that the other of the sheets would fall away when the new stack is started for dispensing, which would cause a dispensing failure. Important is to get both of the first and second sheets through the dispensing opening at the start of dispensing the stack. The present invention achieves this by having the adhesive layer on both of the first and second sheets in such a way that they can both adhere to the end of the preceding stack.

The adherence layer may be a layer of glue, a layer of adhesive tape, the hook or the loop component of hook and loop fastening material (wherein the other component is provided at the end of the preceding stack) or other known adherence means. The adherence layer may, in one embodiment, be provided in the shape of a strip of adherence material, such as a tape. The adherence layer may include a release liner stuck to the adherence layer for shielding the underlying adherence layer to sticking to unintended objects during processing. The adherence layer could be provided by a layer of hooks of the form (but perhaps not the size) of the hook component of traditional hook and loop material. The adherence layer of hooks is able to adhere to the material of the sheets. Such a hook type material that does not require a mating loop component is known in the art.

In an embodiment, one of the first and second sheets forms a top panel of the stack at the start of the stack and is arranged to reveal an underlying panel of the other of the first and second sheets, wherein the adherence layer is applied on both the top panel and the revealed underlying panel. Put another way, one of the first and second sheets has a top panel exposed at the top of the stack and the other of the first and second sheets has a top panel exposed at the top of the stack, wherein one of the top panel overlays the other top panel, yet is arranged to reveal the underlying top panel. The adherence layer is applied on both of the top panels. Put yet another way, the stack has a top planar surface extending perpendicular to a stacking direction of the stack that is partly defined by a panel of the first sheet and a panel of the second sheet, wherein the adherence layer is applied on both the panel of the first sheet and the panel of the second sheet.

In a particular embodiment, the adherence layer is provided by a substrate having a jungle of hook members dispersed thereon, wherein the adherence layer adheres to a corresponding adherence layer by hook to hook interaction. There may be at least 10, 15, 20, 25, 30, 35, 40, 45 or 50 hooks per square centimeter on the substrate. The other side of the layer may be adhesive that adhesively bonds to the first and second sheets of the stack. In this way, two such stacks placed together are able to adhere the first and second sheets thereof to one another by hook to hook interaction. An advantage of the hook to hook possibility as compared to a hook and loop version is that the stacks do not have to be placed in a "right way up" configuration in a dispenser. Dispensing failure could occur if the two hook components or two loop components are placed together in a dispenser as they will not adhere to one another, but this can not happen in the hook to hook adherence layers.

The one of the first and second sheets may be cut in such a way that the top panel reveals the underlying panel of the other of the first and second sheets.

In this way, the top panel only extends partly over the underlying panel to make it possible to conveniently (manufacturing wise) apply the adherence layer to both the first and second sheets.

In the top panel embodiment, the adherence layer may be applied so as to extend in one direction, and the cut includes a component extending in a direction perpendicular to the one direction so that the cut and the adherence layer cross one another in being applied on both the top panel and the revealed panel. In one embodiment, the adherence layer extends along a longitudinal direction of the stack in a plane of the stack extending perpendicular to a stacking direction, wherein the stacking direction is an axis passing through each of the sheet products in the stack. In another embodiment, the cut includes at least a portion extending diagonally with respect to a plane of the stack extending perpendicular to a stacking direction, wherein the stacking direction is an axis passing through each of the sheet products in the stack. By these features of the invention, the adherence layer is conveniently applied to both the first and second sheets because the crossing of the cut line and the extension direction of the adherence layer does not require stringent manufacturing tolerances to be met.

In an embodiment, the part of the top panel cut away and the part remaining are complementary in shape and of the same size. In this way, during manufacturing, the cutting of the top panel of one stack will provide the adjacent stack with a complimentarily cut end panel of an adjacent stack in the manufacturing direction which can thus also receive the adherence layer which can thus also receive the adherence layer according the concept of the present invention.

In another embodiment, a top panel of the stack, which is a panel of one of the first or the second sheets, at the start of the stack is relatively short in a direction perpendicular to a fold line of the interfolded sheet along the sheet so as to reveal an underlying panel of the other of the first or the second sheets, wherein the adherence layer is applied on the top panel and the revealed underlying panel. In this embodiment, the terminal edge of the top panel extends parallel to the fold line and the adherence layer may have a longitudinal direction aligned with the terminal edge and is applied on the top panel for part of the width of the adherence layer and is applied on the revealed underlying panel for the remainder of the width of the adhesive layer. This may provide an easier to grasp starting panel than in a shaped cut implementation as described above. To form the shortened top panel, it can be cut to be shorter in a conventional manner.

Alternatively, a short top panel can be formed by appropriately positioning lines of weakness of the first and second sheets relative to one another to make the short top panel relatively easy to implement in existing manufacturing machines. Accordingly, in an embodiment, the first sheet is a first elongate web, the second sheet is a second elongate web, the first and second webs are divided into separable disposable sheet products by lines of weakness extending laterally across the web, the lines of weakness of the first web and the second web are arranged offset relative to one another in a longitudinal direction of the webs, and fold lines of at least one of the first and second webs are arranged offset relative to the lines of weakness for that web, so that a top panel of the stack, which is a panel of one of the first and second webs, is relatively short in the longitudinal direction of the web to reveal an underlying panel of the other of the first and second webs, wherein the adherence layer is applied on the top panel and the revealed underlying panel. The lines of weakness may be formed by lines of at least one perforation.

In embodiments, the stack has an adherence layer at the start and the end of the stack for adhering the first and second sheets to adjacently placed stacks in a dispensing machine so that the stack is adhered to both a preceding stack and a succeeding stack. The adherence layer at the end of the stack may be as described above for the adherence layer at the start of the stack.

In embodiments, the first sheet is a first elongate web, the second sheet is a second elongate web, the first and second webs are divided into separable hygiene sheet products by lines of weakness extending laterally across the webs and the webs are interfolded with each other to form the stack.

In another aspect of the invention, there is provided a combination of a preceding stack of interfolded first and second sheets respectively defining at least one sheet hygiene product and a succeeding stack of interfolded first and second sheets respectively defining at least one sheet hygiene product, wherein the start of the succeeding stack and the end of the preceding stack are adhered together in such a way that an adherence layer is adhered to both the first and the second sheets of the succeeding stack so that as the end of the preceding stack is pulled through a dispenser opening of a dispenser, both the first and the second sheets at the start of the succeeding stack are securely pulled through the dispensing opening with it.

In this aspect of the invention, the same inventive concept is defined, namely that of having both the first and the second sheets of the succeeding stack secured to a last panel of the preceding stack so as to ensure it gets through the dispensing opening without falling away and causing a dispensing failure. According to this definition, however, the adherence layer is not necessarily only applied to the start of the succeeding stack. It is merely required that between the end of the preceding stack and the start of the succeeding stack, such a layer is present. The stacks of this aspect of the invention can include any of the features defined above for the preceding stacks.

In another aspect of the invention, there is provided a dispenser containing a combination of stacks as defined above as a preceding stack and a succeeding stack with respect to the dispensing order in the dispenser and comprising a dispensing opening through which the sheet hygiene products are dispensed from the stacks, the dispensing opening and the stacks arranged so that the first and second sheets are pulled through a dispensing path to the dispensing opening against the force of gravity, whereby the force of gravity has a tendency to cause one or both of the first and second sheets to fall from the dispensing path. It is in such a dispenser that dispensing failure at the transition between a succeeding and a preceding stack is particularly liable to happen. The secure connection between the stacks according to present invention avoids such a dispensing failure. Further, in such a dispenser, because the weight of the stacks does not have to bare against the product being dispensed, the number of products in the dispenser is not limited by a maximum weight that can bare on a product being dispensed. It should be appreciated, however, that the problem of losing one or both of the sheets of the stack along a dispensing path to a dispensing opening of a dispenser is a general one, and the stacks of the present invention are useful in combination with other types of dispenser.

In an embodiment, the dispenser comprises a clamp for clamping the first and second sheets adjacent the dispensing opening to prevent sheet fall back, wherein the first and second sheets are fed along the dispensing path to the clamp against the force of gravity. The adherence layer of the present invention mitigates any potential dispensing failure in getting the sheets to the clamp at the transition between a preceding stack and a succeeding stack.

In the above dispenser, the term "against the force of gravity" is to be understood in the context of the dispenser being properly mounted. It is unambiguous for the skilled person as to the proper mounting of a dispenser, from regarding the dispenser itself. For example, a known dispenser with a stack reservoir and a dispensing opening at the bottom of the reservoir is intended to be mounted with the opening facing downwards because if you were to tip it up so that the opening faced forwards, then the stack would fall back from the opening making it increasingly difficult or impossible to access the products through the opening as the stack becomes depleted.

In the present application, the words "top" and "start" are used to represent an end of the stack. It is important to appreciate that this does not require the stack to be placed only one way up. That is, a stack facing one way up can be described as having a start or top end. If one was to turn the stack up, the end can still be considered a top or start end. The purpose of the terminology is to differentiate from panels, or portions of the stack that are buried in the depth of the stack and thus can no be used for sticking adjacent stacks together since they are not exposed at either end of the stack, where end is to be understood with respect to the dispensing order of the stack. A skilled person is able to recognise opposing ends of a stack and either one of these ends can be considered a top or start of the stack, unless the stack configuration necessitates that one of the ends must be considered the top or start end for the stack to dispense properly or for some other reason.

The sheets or webs described herein may be fibrous sheet materials or paper based sheet materials. The hygiene sheet products may be paper towels, facial tissues, toilet tissues, or wet wipes.

DETAILED DESCRIPTION OF EMBODIMENTS

Figure 1:
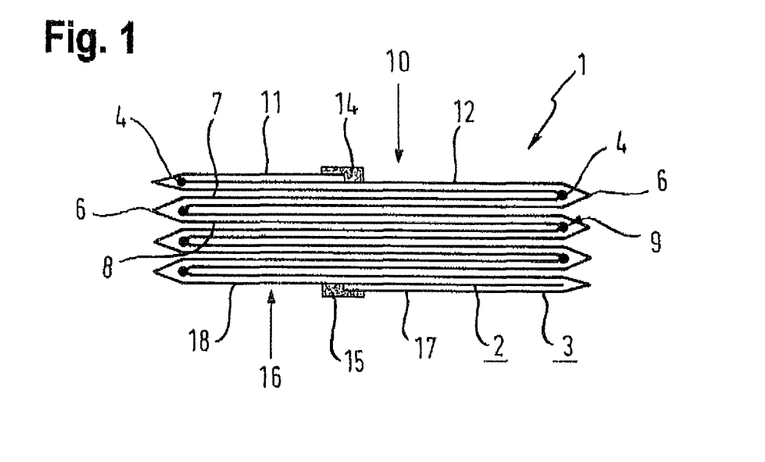
FIG. 1 shows a stack of hygiene sheet products comprising first and second webs that are interfolded with each other. The stack includes a top panel of the first web and a top panel of the second web, wherein the top panel of the first web overlays the top panel of the second web but has been cut away so that the top panel of the second web is revealed by the top panel of the first web. An adherence layer is placed on the top panel of the first web and the top panel of the second web and is exposed at the top of the stack so that it can adhere to an adjacent stack so that when the last sheets of the adjacent stack are pulled through a dispenser opening of a dispenser, the first and second sheets are pulled securely through with it as a result of the direct adherence.
Figure 2:
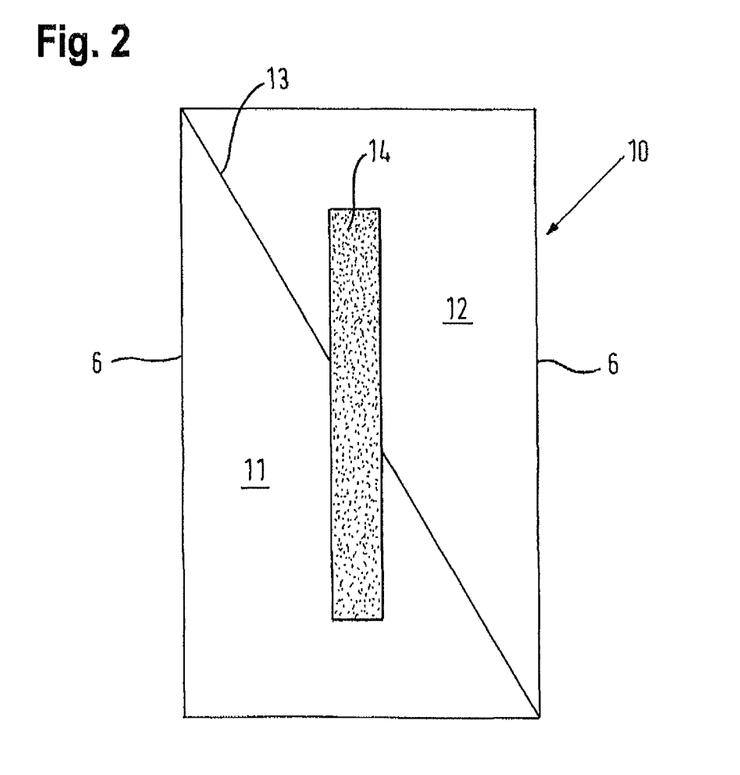
FIG. 2 shows the stack of FIG. 1 when the top of the stack is viewed in plan to show the tape like shape of the adherence layer and its positioning on the start panel of the first web and the start panel of the second web of the stack.

A first embodiment is shown in FIGS. 1 and 2 of the drawings. FIG. 1 shows a stack 1 of interfolded first and second webs 2, 3. The first and second webs 2, 3 are divided into separable hygiene sheet products (e.g. paper hygiene sheet products, paper towel products, tissue products, or the like) by lines of weakness 4 extending laterally across the elongate webs 2, 3. The lines of weakness 4 are illustrated in FIG. 1 with filled-in circles for clarity. The lines of weakness 4 may be lines of perforations.

The lines of weakness 4 for the first web 2 are positioned offset from the lines of weakness 4 for the second web 3 along the longitudinal direction of the webs 2, 3 so that when the first web 2 is pulled through a dispensing opening, the second web 3 will be pulled through the dispensing opening with it. The first web will thus break at the first line of weakness 4 in the dispensing order to leave a pull tab portion of the second web 3 protruding beyond the end of the first web 2 for convenience of grasping at the dispensing opening. This process will alternate during dispensing of the stack 1 so that a separable sheet product of the second web 3 is presented more forwardly than a product of the first web 2 relative to the dispensing opening, which will then be the product that is dispensed by a user and then a product of the first web will be more forwardly presented at the dispensing opening for dispensing by a user, as a result of the offset lines of weakness of the first web 2 and the second web 3. Such a stack 1 ensures one at a time dispensing of hygiene sheet products, while also ensuring that the first and second webs 2, 3 move together along a dispensing path as a result of face-to-face interaction of the continuous webs 2, 3.

As explained above, the lines of weakness 4 of the first and second 2, 3 define separable sheet hygiene products of the stack 1. The interfolding pattern for the stack 1 shown in FIG. 1 is such that each separable sheet product is folded at a fold line 6 to form first and second panels 7, 8 for each separable sheet hygiene product. The interfolding pattern is also such that a fold line 6 of one of the webs 2,3 is provided at each line of weakness 4 of the other of the webs 2, 3. In this way, the interfolding pattern provides a fold line 6 for the first web 2 at a line of weakness 4 for the second web 3 and correspondingly a line of weakness 4 for the first web 2 at a fold line 6 of the second web 3.

The example given in FIG. 1 is just one manner of interfolding first and second webs 2, 3 providing separable sheet hygiene products in an offset manner relative to a dispensing opening containing the stack. Other implementations can be provided. For example, the lines of weakness of one web may be positioned offset from the fold lines of the other web, rather than being aligned with a fold line as shown in FIG. 1. Further, the first and second webs 2, 3 may be folded so that each separable hygiene sheet product includes more than two panels as shown, such as 3, 4, 5 or more panels. In fact, the first and second webs may be interfolded in such a way that each separable hygiene sheet product defines just one panel, which is to say it does not have a fold line at any location other than the lines of weakness. Thus, while one particular interfolding pattern is shown in FIG. 1 for first and second webs respectively defining separable hygiene sheet products between lines of weakness in an offset feed manner, the principles of the present invention (the adherence layer to be described below) are applicable to any known or any other such interfolding pattern for first and second webs.

Further shown in FIGS. 1 and 2 is a top surface 10 of the stack 1, which is a planar surface that can be seen when the stack 1 is viewed from above looking down at the top of the stack 1. This surface 10 is defined partly by a top panel 11 of the first sheet 2 and partly by a top panel 12 of the second sheet 3. The top panel 11 of the first sheet 2 overlays the top panel 12 of the second web 3 but is cut away along a diagonal cut line 13 (FIG. 2) so as to reveal the underlying panel 12 of the second web 3.

In the embodiment of FIG. 2, the cut line 13 is shown as extending diagonally relative to the fold line 6. Numerous other configurations for the cut line can be imagined, provided they serve to reveal the underlying panel of the second web 3. For example, a cut line extending perpendicularly to the fold lines 6 would also provide a top surface 10 of the stack 1 defined in part by a top panel 11 of the first web and an underlying panel 12 of the second web 3. Likewise, a cut line extending parallel with the fold line 6 could also be configured to expose both the first web 2 and the second web 3 at a top surface of the stack 1. While straight cut lines are shown, curved cut lines could also be used.

An adherence layer 14 in strip form is applied on the top surface 10 of the stack 1 so as to be partly applied on the top panel of the first web 2 and to be partly applied on the top panel of the second web 12. In the shown embodiment, the adherence layer is embodied by double sided adhesive tape. One side of the adhesive tape 14 is adhered to the top panels 11, 12. The double sided adhesive tape 14 may include a release liner to shield the underlying sticky tape during processing and which is to be removed when the stack is positioned against an adjacent stack in a dispenser so that the two stacks are secured together. The adherence layer extends along an axis in a plane of the stack extending perpendicular to a stacking direction of the stack, wherein the stacking direction is an axis passing through each of the sheet products in the stack, wherein the adherence layer extends at least 25%, 50%, 70%, 80%, 90% of the full dimension of the stack along the axis, or extends the full dimension of the stack along the axis.

In the embodiments shown in FIGS. 1 and 2, the adherence layer 14 is elongate and extends parallel to the fold lines 6. The adherence layer could also be applied perpendicular to the configuration shown and still be able to serve the purpose of being applied on both the first and second webs 2, 3 so as to stick both the first and second webs 2, 3 to the last hygiene products or product of a preceding stack in a dispenser. Other adherence layers may be used than double sided adhesive tape with a release liner. For example, a strip of glue may be rolled or sprayed or otherwise applied on the first and second sheets 2, 3. Another example would be the use of one component of a hook and loop fastener, which may require the other component of the hook and loop fastener to be provided at the bottom of the preceding stack in a dispenser. Alternatively, a hook component could be provided that is adhereable directly to the material, e.g. paper based material, at the bottom of a preceding stack by nature of the fineness of the hooks. In this alternative a mating loop component would not be necessary.

The hook and loop or just hook materials could also be provided in the form of a tape that extends parallel to the fold lines 6 of the stack 1.

Referring back to FIG. 1, it can be seen that a corresponding adherence layer 15 is provided at a bottom surface 16 of the stack 1. Also, the bottom surface 16 of the stack 1 is defined partly by a bottom panel 17 of the second web 3 and a bottom panel 18 of the first web 2. The bottom panel 17 of the second web 3 overlays the bottom panel of the first web 2 and has been cut away in a complementary manner to that described above for the top panels 11, 12 of the first and second webs 2, 3. This complementary cut line at opposing ends of the stack 1 is a convenient result of the manufacturing process in that cutting away a top panel of the stack 1 so as to reveal an underlying panel will provide a complementary cut in the next stack in the manufacturing process, thereby resulting in each stack produced having complementary cut lines at the top and the bottom surfaces thereof.

As with the adherence layer 14 exposed at the top of the stack 1, the adherence layer 15 exposed at the bottom of the stack 1 is partly applied on the bottom panel 17 of the second web 3 and is partly applied on the bottom panel 18 of the first web 2. By providing a stack 1 having adherence layers 14, 15 on the top and the bottom of the stack 1, the combination of first and second such stacks will provide mating adherence layers, which can provide particularly strong adherence in combination.

The mating adherence layer of first and second stack also opens up the possibility to use two part components for the adherence layers so that the adherence properties are only felt when the two parts come into contact with one another. Such two parts adherence layers are conventional hook and loop fasters, where one of the hook and loop components could be provided on the top of the stack and one of the hook and loop components could be provided on the bottom of the stack. Another two part adherence layer could be known two part adhesives whose adhesive properties only activate once the respective parts are brought into contact. Such a configuration may be advantageous since it does away with the requirement for a release liner such as when double sided adhesive tape is used as the adherence layer 14, as described above.

Alternatively, the adherence layer 14 on the top surface 10 of the stack 1 and the adherence layer 15 on the bottom surface of the stack 1 could be offset from one another so that when two such stacks are stacked on top of one another in an aligned manner, the adherence layers 14 and 15 only partly contact with one another or do not contact with one another, so as to provide overall increased adherence coverage between the top and bottom surfaces of the adjacent stacks.

In use, a stack 1 as shown in FIG. 1 will be mounted in a dispenser so that the top surface 10 of the stack 1 is brought into engagement and complete overlapping alignment with a bottom surface of a stack being dispensed through the dispenser. As the existing or preceding stack is depleted and the last sheet is drawn through a dispensing opening of the dispenser, the bottom of the preceding stack is stuck to the adherence layer 14 on the top of the succeeding stack so that both the top panel 11 of the first sheet 2 and the top panel 12 of the second sheet 3 is stuck to the bottom of the preceding stack to ensure that both of the webs 2, 3 of the succeeding stack are securely drawn through the dispensing path of the dispenser to the dispensing opening of the dispenser. As both of the first and second webs 2, 3 are stuck to the bottom of the preceding stack, it can be assured that one or both of the start of the first and second webs 2, 3 do not fall away along the dispensing path and thus dispensing failure as a result of a transition between respective stacks is avoided.

Another embodiment of the present invention will be shown and described with respect to FIGS. 3 to 5 in the following. It should be noted that the discussion given above regarding various alternatives for the implementation of the adherence layer or layers is applicable to the present embodiment, but will not be repeated for brevity. The second embodiment is described to show another way of exposing respective webs of a stack at a top surface of the stack, and thus is described with the purpose of explaining the modifications from the above described embodiments given with respect to FIGS. 1 and 2. The remaining common subject matter between the embodiments is not described again in the following.

Figure 3:
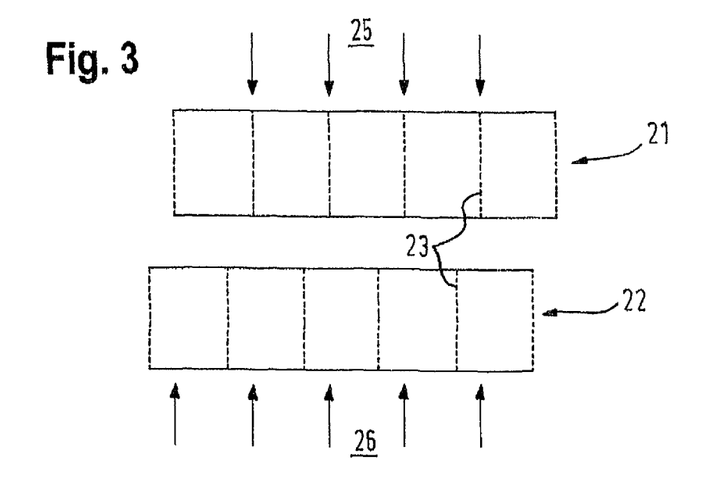
FIG. 3 illustrates first and second webs as they proceed along a machine direction in a manufacturing process and shows the relative positions of lines of weakness and fold lines for providing a convenient to manufacture way of revealing both a top panel of the first web and a top panel of a second web at the top of a stack so that an adherence layer can be applied on both of these webs so that both of the webs are reliably secured to a preceding stack in a dispenser.

Referring to FIG. 3, there is shown first and second webs 21, 22 divided into separable sheet hygiene products by lines of weakness 23 extending laterally across the elongate first and second webs 21, 22. Also shown in FIG. 3 are arrows to indicate where a fold line will be positioned when the first and second webs 21, 22 are interfolded into a stack 24 as shown in FIG. 4. As can be seen, the fold lines 25 for the first web 21 are positioned at each of the lines of weakness 23, while the fold lines 26 for the second web are offset by ⅓ of the length of a separable sheet hygiene product along the length of the second web 22 from the lines of weakness 23.

The offset of the lines of weakness 23 along the longitudinal direction of the first and second webs 21, 22 ensures that pull tab portions more forwardly protruding relative to a dispensing opening for one web as compared to the other are alternately provided for a user to grasp at the dispensing opening to ensure that one sheet hygiene product is dispensed at a time. Further, the offset of the fold lines 26 for the second web 22 relative to the lines of weakness 23 for the second web 22 allow the first and second webs 21, 22 to be interfolded into a stack 24 in such a way that a top panel of the first web 21 and a top panel of the second web 22 are both exposed at a top surface 29 of the web 24, so that an adherence layer 30 can be partly stuck on the respective top panels 28, 27, as is described further below with respect to FIGS. 4 and 5.

Figure 4:
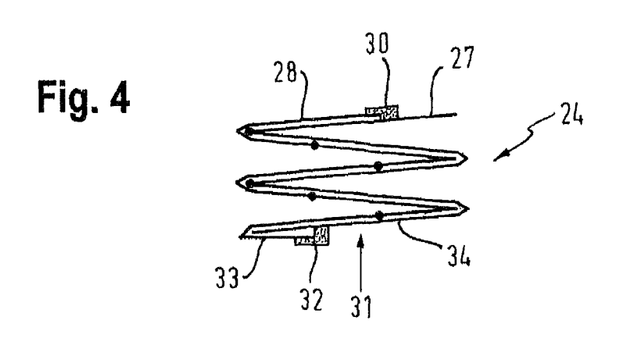
FIG. 4 shows the webs of FIG. 3 as formed into a stack to show the folding pattern and to show the positions of the lines of weakness for the first and second webs in the stack in greater detail.

Referring to FIG. 4, the interfolding pattern for the stack 24 can be seen as a cross-section through the stacking direction of the stack 24. As shown, the lines of weakness 23 for the second web 22 are positioned intermediate fold lines 26 of the second web 22, while the fold lines 25 for the first web 25 are positioned at the lines of weakness 23 of the first web 21. These results in the first and second webs 21, 22 being interfolded so that the longitudinal extent of the second web 22 is shifted along the longitudinal direction of the webs 21, 22 relative to the first web 21 by a non-integral fraction of the distance along the webs 21, 22 between the lines of weakness 23. When interfolded and stacked with such a longitudinal shift, the top surface 29 can be defined by a short top panel 28 of the second web 22 along the length of the second web 22 relative to an underlying top panel 27 of the first web 21. In this way, the top surface 29 of the stack 24 is defined in part by the short top panel 28 of the second web 22 and the protruding longer top panel of the top panel 27 of the first web 21. This length differential enables both the first web 21 and the second web 22 to be disposed at the top surface 29 of the stack 24 so that an adherence layer 30 can be applied to both of them and so that both the first web and the second web 22 can be adhered to the bottom of an adjacent stack in a dispenser. This is achieved with only a very minor adjustment to the manufacturing process by appropriately configuring the relative locations of the lines of weakness 23 and the fold lines 25, 26 of the first and second webs 21, 22.

Figure 5:
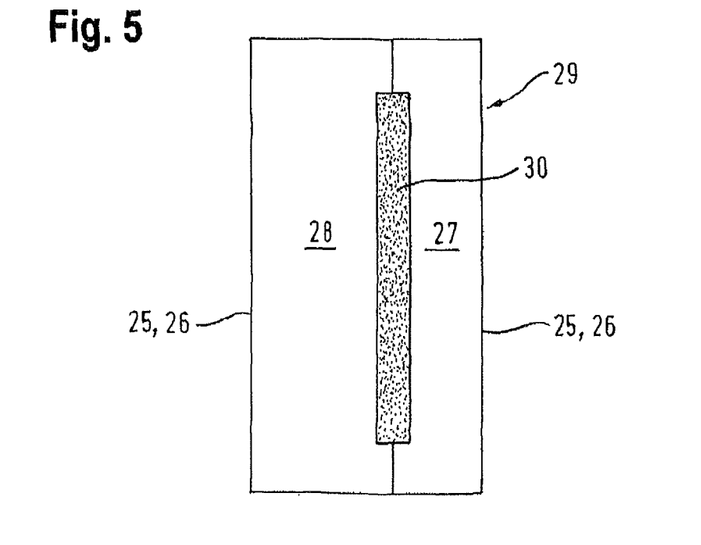
FIG. 5 shows the stack of FIG. 4 when the top of the stack is viewed in plan to show that the top panel of the first web is short relative to the top panel of the second web and also shows an adherence layer provided in a tape like form so that part of the width of the tape is applied on the top panel of the first web and the remaining part is provided on a top panel of the second web.

In the embodiments shown in FIGS. 3 to 5, the fold lines 25 of the first web 21 are positioned at the lines of weakness 23 and the fold lines 26 of the second web are shifted relative to the lines of weakness 23 of the first web 22. This is just one way of a countless number of variations for providing a shortened top panel of one web that partly overlies a loner panel of another web in an interfolded stack. Important is that the fold lines of one of the webs is positioned closer to or at the line of weakness for that web than the fold lines for the other web so that a longer panel for the one web can be provided than for the other web, whereby the one web is positioned under the other web in the interfolding process. Thus, one can imagine configurations where the fold lines for the first web and the fold lines for the second web are both offset from the lines of weakness and offset from one another relative to the lines of weakness so as to provide the short and long top panels for the resulting stack as required by this embodiment of the invention.

In the arrangement shown in FIGS. 3 to 5, there is one panel per sheet hygiene product. As explained previously with respect to FIGS. 1 and 2, more than one panel per hygiene sheet product can be provided, in a manner known to the skilled person.

An adherence layer 30 is applied on the top surface 29 of the stack 24 so as to be partly applied on the top panel 28 of the second web 22 and to be partly applied on the top panel 27 of the first web 21. In the shown configuration, the adherence layer 30 is elongate and extends parallel to the fold lines 25, 26 so that part of the width of the adherence layer 30 is applied on the top panel 28 of the second web 22 and part of the width of the adherence layer 30 is applied on the top panel 27 of the first web 21. In the shown embodiment, the adherence layer 30 is provided as double sided adhesive tape having a release liner on one side of the adhesive tape. The release liner shields the double sided adhesive tape 30 during processing and is to be removed in order to allow it to be stuck onto the underside of a preceding stack when the stack 24 is stacked in a dispenser.

Numerous other possibilities exist for the adherence layer 30, as described above with respect to FIGS. 1 and 2. For example, while the adherence layer 30 is shown as extending in parallel to the fold lines 25, 26 of the stack 24, it could extend perpendicularly thereto and still be applied on the top panels 27, 28 of the first and second webs 21, 22, respectively.

Referring to FIG. 4, it can be seen that the bottom surface 31 is also defined by a short bottom panel 33 of the second web 22 overlying a longer bottom panel 34 of the first web 21 so that both panels are exposed at the bottom surface 31 of the stack 24. In the same way as the adherence layer 30 is applied on the top panels 27, 28, a second adherence layer 32 is applied on both of the bottom panels 33, 34 so that a stack positioned against the bottom of the stack 24 will be stuck to it and, more particularly, both the first and second webs 21, 22 of the stack 24 will be secured to the succeeding stack. If the succeeding stack is a stack according to that shown in FIGS. 3 to 5, then the top adherence layer 30 of the succeeding stack will be secured to the bottom of the stack 24 and the bottom adherence layer 32 of the stack 24 will be secured to the top of the succeeding stack. Since the first and second adherence layers 30, 32 are offset from one another, they will not come into contact when the two stacks are stacked together in an aligned manner. It is, however, possible to arrange the adherence layers 30, 32 so that they are centrally positioned or so that they come into contact in some other way, thereby enabling the use of two component adherence layers that only act once the two components are in contact with one another, as described above.

Other alternatives to the embodiments shown in FIGS. 1 to 5 are also possible. For example, there is known from WO 2010/007260 the use of adhesive tape to connect one stack to an adjacent stack in a dispenser. The adhesive tape has a release liner positioned over the adhesive tape. What characterises the disclosure of WO 2010/007260 is that the release liner has an extension portion extending beyond the underlying adhesive that is bent so as to protrude out from one of the sides defining a stacking direction of the stack. The protruding extension portion can be pulled with the stacks in position in a dispenser to remove the release liner from the adhesive tape to stick the neighbouring stacks together. This idea enables a maintenance person to position and stack stacks of interfolded hygiene sheet products in a dispenser and only after the proper positioning of the stacks has been confirmed is it necessary to remove the release liner from the adhesive tape. This is made possible by the protruding extension portion of the release liner. We envisage the use of a release liner that covers the adherence layer described herein and which protrudes out from a side defining a stacking direction of the stack to be a useful modification of the embodiments of the present invention disclosed herein.

It is deemed to be particularly advantageous for the manner by which neighbouring stacks are connected to one another for interfolded first and second web-type stacks as disclosed herein to be applied to a dispenser in which the products are drawn along a dispensing path against the force of gravity. It is when sheet hygiene products are being moved against gravity that a risk is especially prevalent of one or both of the first and second sheets of the interfolded stack falling away. One example of a suitable dispenser with which the interfolded stack of first and second sheets of the present invention can be used is disclosed in FIG. 1 of WO 2006/071148.

In the dispenser of FIG. 1 of WO 2006/071148, neighbouring stacks of interfolded sheets will be placed against one another in the stacking direction and the hygiene sheet products will be withdrawn along a dispensing path that runs against gravity for at least a portion thereof. Because the weight of the stacks of interfolded sheets is not pressed against the dispensed products in such a bottom loading dispenser, the number of stacks can be greatly increased as compared to dispenser arrangements where the weight of the stacks bares against the hygiene sheet products being dispensed. Since both the first and second sheets are exposed at the top of the stack to be secured to the bottom of a stack currently being dispensed and since the adherence layer is applied on both of the exposed portions of the first and second webs at the top of the stack, it can be reliably assured that both the first and second webs will be successfully pulled through the dispensing path to the dispensing opening because they are both adhered to be bottom of the preceding stack.

In the dispenser of FIG. 1 of WO 2006/071148, there is provided a nip adjacent a dispensing opening that will serve to clamp sheet material products adjacent the dispensing opening to hold them there so that the forward most sheet hygiene products of the first and second webs is available for grasping by a user through the dispensing opening. As the user pulls the protruding sheet hygiene product of one of the first and second webs, the other of the first and second webs is pulled through the dispensing opening with it. The sheet material product being grasped by the user is torn at the line of weakness, leaving the protruding portion of the sheet hygiene product of the other web in position at the dispensing opening for subsequent product dispensing. The nip or clamp adjacent the dispensing opening will, according to the present invention, ensure that the first and second webs are held clamped adjacent the dispensing opening. The adherence layer of the present invention ensures that both the first and second webs reach the nip or clamp adjacent the dispensing opening of the dispenser at a transition from the webs of one stack to the webs of the next stack, to avoid dispensing failure.

The invention claimed is:

1. A stack of interfolded first and second sheets, wherein the stack comprises an adherence layer for adhering a start of the stack to an end of a preceding stack in a dispenser, and wherein the adherence layer is applied on the first and the second sheets so that the first and second sheets at the start of the stack are adherable to the end of the preceding stack.

2. The stack of claim 1, wherein the adherence layer is one of a layer of glue, a layer of adhesive tape, and a mechanical fastener.

3. The stack of claim 1, wherein the adherence layer is provided in the shape of a strip of adherence material.

4. The stack of claim 1, wherein one of the first and second sheets forms a top panel of the stack at the start of the stack, the top panel is arranged to reveal a panel of the other of the first and second sheets so that the top panel and the revealed panel are exposed to the preceding stack at the top of the stack, wherein the adherence layer is applied on both the top panel and the revealed panel.

5. The stack of claim 4, wherein the top panel overlays part of the revealed panel.

6. The stack of claim 4, wherein the one of the first and second sheets is cut along a cut line in such a way that the top panel reveals the panel of the other of the first and second sheets.

7. The stack of claim 6, wherein the cut line and the adherence layer cross one another so that the adherence layer is applied on both the top panel and the revealed panel.

8. The stack of claim 6, wherein the cut line includes at least a portion extending diagonally with respect to a plane of the stack extending perpendicular to a stacking direction, wherein the stacking direction is an axis passing through each of the sheet products in the stack.

9. The stack of claim 6, wherein the part cut away and the part remaining of the top panel are complementary in shape and of the same size.

10. The stack of claim 1, wherein a top panel of the stack, which is a panel of one of the first or the second sheets, at the start of the stack is relatively short in a direction perpendicular to a fold line of the interfolded sheet along the sheet so as to reveal a panel of the other of the first or the second sheets, wherein the adherence layer is applied on the top panel and the revealed panel.

11. The stack of claim 10, wherein the first sheet is a first elongate web, the second sheet is a second elongate web, the first and second webs are divided into separable hygiene sheet products by lines of weakness extending laterally across the web, the lines of weakness of the first web and the second web are arranged offset relative to one another in a longitudinal direction of the webs, and the positioning of fold lines of the first web relative to the lines of weakness of the first web in the longitudinal direction is different from the positioning of the fold lines of the second web relative to the lines of weakness of the second web so that a top panel of the stack, which is a panel of one of the first and second webs, is relatively short in the longitudinal direction of the web to reveal an underlying panel of the other of the first and second webs, wherein the adherence layer is applied on the top panel and the revealed underlying panel.

12. The stack of claim 11, wherein a terminal edge of the top panel extends parallel to the fold line.

13. The stack of claim 12, wherein the adherence layer has a longitudinal direction aligned with the terminal edge and is applied on the top panel for part of the width of the adherence layer and is applied on the revealed underlying panel for the remainder of the width of the adherence layer.

14. The stack of claim 1, wherein the adherence layer extends along a longitudinal direction of the stack in a plane of the stack extending perpendicular to a stacking direction, wherein the stacking direction is an axis passing through each of the sheet products in the stack.

15. The stack of claim 1, wherein the adherence layer extends along an axis in a plane of the stack extending perpendicular to a stacking direction of the stack, wherein the stacking direction is an axis passing through each of the sheet products in the stack, wherein the adherence layer extends at least 25% of the full dimension of the stack along the axis.

16. The stack of claim 1, wherein the first sheet is a first elongate web, the second sheet is a second elongate web, the first and second webs are divided into separable hygiene sheet products by lines of weakness extending laterally across the webs, the webs are interfolded with each other to form the stack, and the lines of weakness of the first elongate web are offset in the longitudinal direction of the webs from the lines of weakness of the second elongate web so that as the products are dispensed, a terminal product from the first web and a terminal product from the second web, which are the products next to be dispensed for the respective webs, are alternately further forward in the longitudinal direction.

17. The stack of claim 1, wherein there is a boundary line between a top panel of the first sheet and a top panel of the second sheet as seen in plan view of a top surface of the stack, and wherein the adhesive layer is applied on the top panels so as to cross the boundary line.

18. The stack of claim 1, wherein the stack has an adherence layer at the start and the end of the stack for adhering the first and second sheets to adjacently placed stacks in a dispensing machine so that the stack is adhered to both a preceding stack and a succeeding stack.

19. The stack of claim 18, wherein the adherence layers are respectively formed of a first part of a two part adherence material and a second part of a two part adherence material, wherein the adherence effect of the adherence layers only properly activates when the first and second parts come into contact, and wherein the adherence layers are positioned on the stack so that if a corresponding such stack was placed start to end and so that the end surfaces of the stacks completely overlap, then the start and end adherence layers of the respective stacks would come into contact and activate the adherence effect.

20. The stack of claim 1, wherein a top surface at the start of the stack, which defines a top plane of the stack perpendicular to an axis passing through each of the products in the stack, is defined in part by a top panel of the first sheet and in part by a top panel of the second sheet, wherein a bottom surface at the end of the stack, which defines a bottom plane of the stack perpendicular to an axis passing through each of the products in the stack, is defined in part by a bottom panel of the first sheet and a bottom panel of the second sheet, wherein one of the top panels overlays the other to reveal the other top panel, which defines a full panel, and one of the bottom panels overlays the other to reveal the other bottom panel, which also defines a full panel, wherein the one top panel and the one bottom panel are complimentarily sized and shaped with one another so that they can be pieced together to define a full panel.

21. A combination of a preceding stack of interfolded first and second sheets respectively defining at least one sheet hygiene product and a succeeding stack of interfolded first and second sheets respectively defining at least one sheet hygiene product, wherein a start of the succeeding stack and an end of the preceding stack are adhered together in such a way that an adherence layer is adhered to both the first and the second sheets of the succeeding stack so that as the end of the preceding stack is pulled through a dispenser opening of a dispenser, both the first and the second sheets at the start of the succeeding stack are securely pulled through the dispensing opening with it.

22. A dispenser containing a combination of first and second stacks according to claim 1, the stack providing a preceding stack and a succeeding stack with respect to the dispensing order in the dispenser, the dispenser comprising a dispensing opening through which the sheet hygiene products are dispensed from the stacks, the dispensing opening and the stacks arranged so that the first and second sheets are pulled through a dispensing path to the dispensing opening against the force of gravity, whereby the force of gravity has a tendency to cause one or both of the first and second sheets to fall from the dispensing path.

23. The dispenser of claim 22, wherein the dispenser comprises a clamp for clamping the first and second sheets adjacent the dispensing opening to prevent sheet fall back, wherein the first and second sheets are fed along the dispensing path to the clamp against the force of gravity.

\* \* \* \* \*